United States Patent [19]

Bals

[11] 4,297,218
[45] Oct. 27, 1981

[54] PROCESS AND APPARATUS FOR EXTRACTING A SUBSTANCE FROM A BODY OF WATER

[76] Inventor: Hans G. Bals, Blümgesgrund 44, 6460 Gelnhausen, Fed. Rep. of Germany

[21] Appl. No.: 79,059

[22] Filed: Sep. 26, 1979

Related U.S. Application Data

[63] Continuation-in-part of Ser. No. 882,447, Mar. 1, 1978, which is a continuation of Ser. No. 741,130, Nov. 11, 1976, abandoned.

[30] Foreign Application Priority Data

Sep. 27, 1978 [DE] Fed. Rep. of Germany ....... 2842058

[51] Int. Cl.³ ............................................... C02F 1/28
[52] U.S. Cl. .................................. 210/661; 210/284; 210/286; 423/6
[58] Field of Search ................. 210/20, 268, 285, 286, 210/289, 291, 293, 24, 153, 661, 682, 170, 242.1, 253, 284; 423/6, 7

[56] References Cited

U.S. PATENT DOCUMENTS

| 763,326 | 6/1904 | Roche | 210/242 R |
|---|---|---|---|
| 1,671,864 | 5/1928 | Higgins | 210/661 |
| 2,742,381 | 4/1956 | Weiss et al. | 210/20 |
| 3,763,049 | 10/1973 | Gerber | 423/7 |
| 4,039,445 | 8/1977 | Heide et al. | 423/6 |
| 4,065,391 | 12/1977 | Farabaugh | 210/293 |
| 4,086,162 | 4/1978 | Benzaria | 210/20 |

FOREIGN PATENT DOCUMENTS 2550751  5/1977  Fed. Rep. of Germany .
 199481 11/1938  Switzerland ...................... 210/293

Primary Examiner—Ivars C. Cintins
Attorney, Agent, or Firm—Laurence R. Brown

[57] ABSTRACT

Water is passed from a relative flow thereof in a horizontal direction, into a substantially vertical passage and through a bed of absorption material in a fluidized state, in order to extract a substance from the water. The static pressure of the water is increased by passing the water through a diffuser means before it passes into the vertical passage.

22 Claims, 9 Drawing Figures

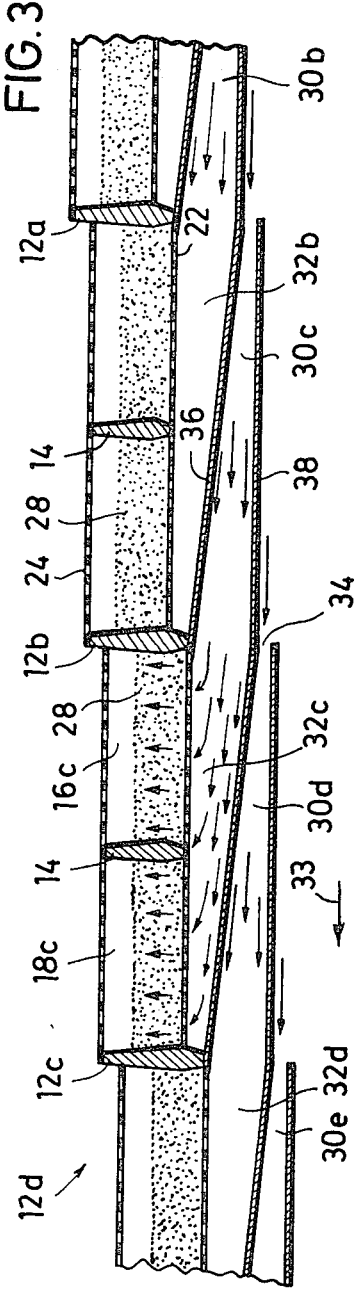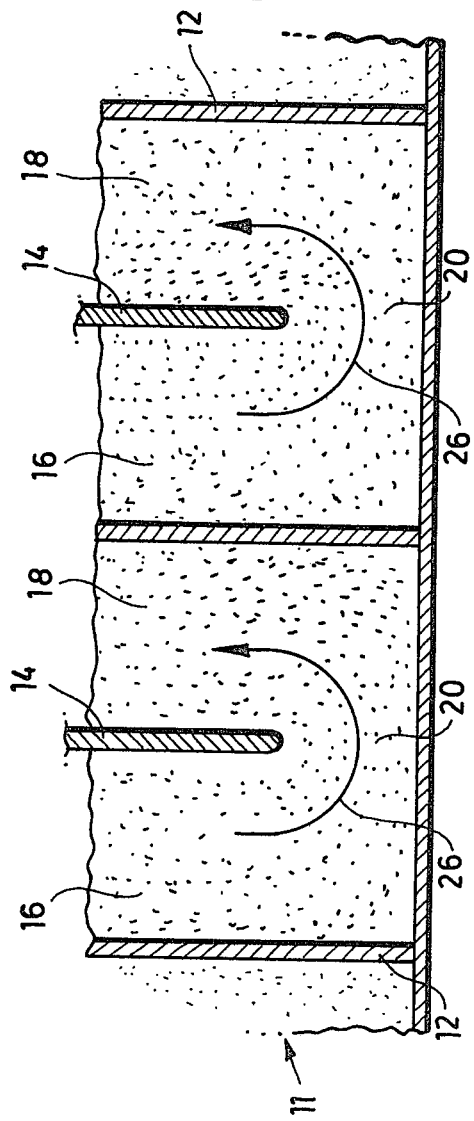

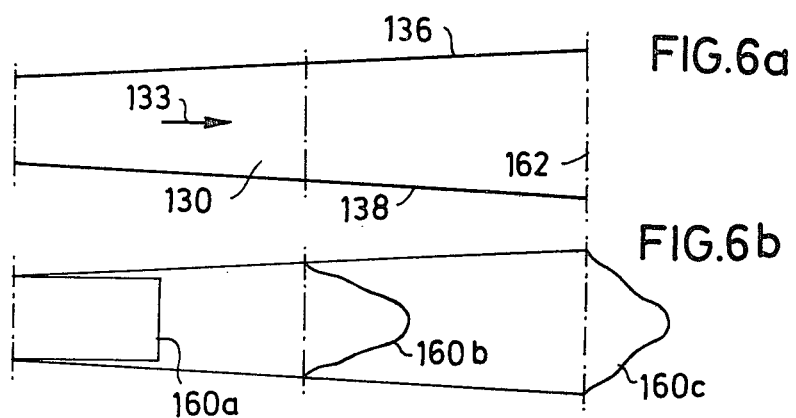
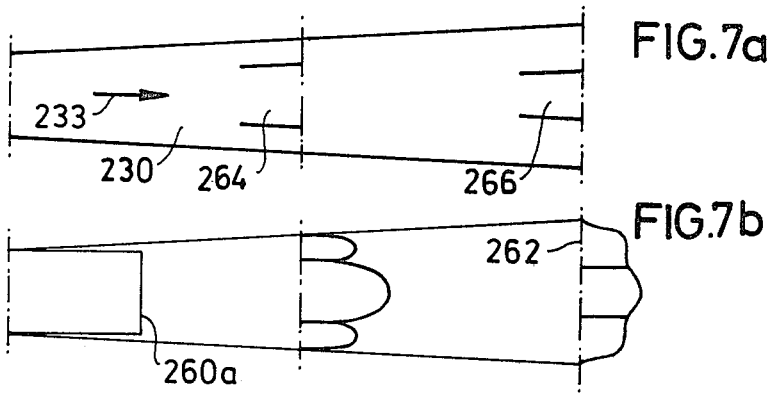

PROCESS AND APPARATUS FOR EXTRACTING A SUBSTANCE FROM A BODY OF WATER

This invention is a continuation-in-part of copending application of the same inventor Ser. No. 882,447 filed Mar. 1, 1978 itself a continuation of Ser. No. 741,130 filed Nov. 11, 1976, now abandoned.

BACKGROUND OF THE INVENTION

In relation to the production or extraction of for example dissolved, suspended or chemically bonded substances, such as uranium or other metal compounds, from water, an apparatus and a process have been disclosed in the above-mentioned copending application (German Offenlegungsschrift No. 25 50 751) wherein the water, which is flowing in a substantially horizontal direction in relation to the apparatus, is caused to flow substantially in a vertical direction, through a fluidized bed of adsorber particles which bond the substances. In this process, a plurality of fluidized beds are disposed in projecting cantilever arms carried by a carrier member, with the water flowing over the arms and also therethrough. In this arrangement, the cantilever arms have adjustable guide surfaces for influencing and guiding the flow of water.

Since for example seawater but also other water contains the substances which are to be considered for extraction, only in an extremely diluted form, for example with a metric ton of seawater containing only about 3 mg of uranium, in order to produce such substances from water it is necessary to pass extremely large amounts of water through the apparatus. Thus, in order to produce uranium in a quantity which is economically attractive, it is necessary for water to be passed through the apparatus, in an amount which is of the order of magnitude of thousands of millions of tons. The specific nuclear energy content of water in the sea is thus very low. This means that only a very small fraction of this energy can be used for the entire production process, per unit of water to be treated, in order for the energy balance sheet to show a positive figure at the end of the operation.

Accordingly, for economically producing for example uranium, using the process referred to above, it is necessary to take the energy which is required for fluidizing the bed of adsorber particles, from other energy sources present in the sea. The natural sea currents or possibly also the current in a river offer themselves as possibilities in this respect. It has been found however that the kinetic energy in currents of this kind is at such a low level that it is not possible to utilize this energy for maintaining the above-mentioned fluidized bed, without special measures being taken, such as the guide surfaces in the above-mentioned process. However, these guide means are often not sufficient to achieve the required effect.

SUMMARY OF THE INVENTION

An object of the invention is to overcome the difficulties and disadvantages of the above-described known process and apparatus.

Another object of the invention is to utilize the flow energy which is available in a flowing body of water as effectively as possible, in order to form and maintain the fluidized bed of adsorption material particles.

A further object of the invention is to provide apparatus for producing uranium and other materials from a body of water, which is of simple construction, needing little repair and trouble-free.

A still further object of the invention is to provide such apparatus which can produce uranium and other substances from a body of water, at an economical cost.

Yet another object of the invention is to produce uranium or other substances from water, with a high degree of efficiency.

A still further object of the invention is to provide means for utilizing the flow energy in a flowing body of water, at a cost which is not significant within the total expenditure involved.

In a process and apparatus for producing substances such as uranium or other metal compounds from water, a flow of water relative to the apparatus is directed eg from a substantially horizontal flow direction into a substantially vertical flow direction, and through a fluidized bed of adsorption material. The water which is to be passed through the fluidized bed is passed through a diffuser means before being deflected into the vertical direction, for the purposes of increasing the static pressure of the water. In the diffuser means, the flow of water is slowed down, in accordance with the enlargement in the diffuser means cross-section. At the same time, the static pressure rises in the diffuser means, while the dynamic pressure is reduced. The rise in static pressure which takes effect in this way is used to urge the water, after being diverted into the form of an upwardly or downwardly moving flow, that is to say, substantially vertically, through the adsorber bed and possibly stabilizing means which may be provided. The pressure losses which occur when the water flows through the apparatus, that is to say, essentially the diffuser means, any transition region or flow chamber which may be provided, the housing which accommodates the bed and the stabilizing means, must be lower than the dynamic pressure in the flow.

It will generally be advantageous for the flow speed and the static pressure of the water to be rendered uniform by means of suitable control means or installations in the diffuser means, with the result that the static pressure is rendered uniform at the exit from the diffuser means, and in the entire intermediate chamber or region if provided, so that the substantially vertically upwardly or downwardly directed flow of water in the bed of adsorber particles, is at least to a certain extent uniform over the cross-sectional area of the bed. In this way it is possible to provide for a calm non-turbulent flow pattern in the adsorber bed so that the individual adsorber particles only move, relative to each other, within the bed, to a slight degree. This promotes satisfactory charging of the particles with the substance to be extracted, and reduces the amount of abrasion material or dust and slurry which is produced. This regularization action in respect of flow speed and static pressure over the cross-section of the diffuser means is to be carried out in such a way that the degree of efficiency of the dynamic pressure/static pressure conversion operation is not reduced, but on the contrary tends to be increased.

In consideration of the large amounts of water which are to be passed through the apparatus, apparatus for extracting the above-mentioned substances will generally be of correspondingly large dimensions. In many cases, for example when apparatus of this kind is anchored in a flow of seawater, it will be inevitable that the water, before flowing into the diffuser means, will flow along some outside surfaces of the apparatus and, in so doing, will suffer from a reduction in speed and thus a general drop in pressure, because of the inevitable friction which occurs between the surface of the apparatus and the boundary layer of the water. When the water is flowing at a relatively slow normal speed, the flow speed which is reduced in consequence of the above-mentioned surface friction may no longer be sufficient to produce the necessary static pressure within the housing which accommodates the fluidized bed. To avoid this disadvantageous phenomenon, at least the low-energy part of the boundary layer of water, which is produced before reaching the diffuser means, under the retarding influence of surface friction, is prevented from passing into the opening of the diffuser means by means of a by-pass or diversion passage. This is advantageously effected in such a way that the low-energy boundary layer or at least part thereof is separated from the adjacent layer of water which is flowing at a sufficient flow speed, and diverted out of the inlet region of the diffuser means, so that only water which is flowing at a sufficient speed can pass into the diffuser means.

Apparatus for carrying out the process of the invention, comprises a housing which has at least one substantially vertical passage for accommodating the fluidized bed and for the through-flow of water. A substantially horizontally extending diffuser means is disposed upstream of the entrance to the vertical passage, and the inlet opening of the substantially horizontally extending diffuser means is oppositely directed to the substantially horizontal flow of water. It will be appreciated that it will not always be possible for the inlet opening, or the longitudinal axis of the diffuser means to be disposed precisely parallel to the flow of water and in opposition thereto. However, it is necessary for the diffuser means to be arranged, in respect of its inlet opening, in such a way that a substantial part of the flow of water takes effect in the above-described manner and thus passes into the vertical passage.

The lower and upper wall or surface of the diffuser means may extend substantially horizontally or parallel to the lower or upper wall respectively of the housing of the apparatus, and thus substantially parallel to the direction of flow of water. It is however also possible for upper and lower walls of the diffuser means to be arranged symmetrically with respect to a horizontal central plane.

The dimension of the diffuser means in the direction of flow may approximately correspond to the cross-sectional dimensions of the passage or the housing in the direction of flow. An intermediate chamber or region may be disposed between the diffuser means and the housing inlet, the intermediate region or chamber being defined by the housing of the apparatus or by a screen-like or sieve-like flow resistance means which is disposed in or adjacent to the inlet, and by a wall, wherein the distance between the wall and the housing may decrease in the direction of flow of the water. This causes the flow of water to be favorably influenced and regularized in this intermediate region or chamber. It is also possible for the flow speed to be reduced in this intermediate region or chamber, with a corresponding rise in static pressure.

If the vertical passage in the housing of the apparatus is also enlarged in a diffuser-like manner in the direction of flow, the formation of a non-turbulent flow is additionally promoted, and this, in conjunction with the above-mentioned effect of rendering the speed of the water uniform over the cross-section of the housing or the bed, has the result that the individual adsorber particles remain virtually stationary, taking into account the other parameters which have an influence in this respect, for example the weight, size and form of the adsorber particles.

The apparatus is advantageously so arranged that a plurality of housings are disposed one behind the other in the direction of flow of the water and are disposed at different levels relative to each other in such a way that the respective following housing in the direction of flow is disposed at a lower level than the preceding housing. In this arrangement, the diffuser means of one housing may be disposed below the preceding housing, so as to provide a compact construction.

When the water flow speed is low, it is advantageous for the inlet opening of the diffuser means to be so arranged that it is at a spacing from adjacent wall surfaces of the respective preceding housing or structural unit, a by-pass or diversion passage being disposed above or below the diffuser means and parallel thereto, which passage diverts the boundary layer or part thereof, which is directly below or above the housing or diffuser means upstream thereof in the flow direction. The distance of the diffuser means from the above-mentioned adjacent wall surface should correspond, as far as possible, at least approximately to the height of the boundary layer of water which is reduced in speed by virtue of its flowing along the wall surface. It will be appreciated that this will depend on the respective flow conditions, in particular the normal, that is to say, the non-retarded flow speed. Generally, the diversion passage will extend over the entire width of the diffuser means and will extend betwee the latter and the housing of the preceding housing, and will be open at its outlet end between two housings which are disposed successively in the direction of flow.

When using adsorber materials whose specific gravity is greater than that of water, the passage which accommodates the fluidized bed should have the water flowing upwardly therethrough, in order to maintain the bed in a fluidized condition. In the opposite case, that is to say, when the adsorber material is of lower specific gravity than water, the water should flow through the passage in the opposite direction, that is to say, in a downward direction. This latter arrangement would mean that the embodiments described hereinafter and illustrated in the drawing, which are provided for an upward flow, would have to be arranged in an inverted mirror-image position with respect to a horizontal plane, so that the diffuser means is then disposed above the respective associated housing.

BRIEF DESCRIPTION OF THE DRAWINGS

FIG. 3 is a diagrammatic view, corresponding to that shown in FIG. 2, of part of a further embodiment of the apparatus, FIG. 4 shows a partly sectional plan view of the FIG. 3 embodiment, FIG. 6a shows a diagrammatic view in longitudinal section through one embodiment of a diffuser means, together with FIG. 6b showing the flow speed pattern produced in the FIG. 6a diffuser means, and FIGS. 7a and 7b show views corresponding to FIGS. 6a and 6b respectively, in respect of another embodiment of a diffuser means.

DESCRIPTION OF THE PREFERRED EMBODIMENTS

Figure 1:
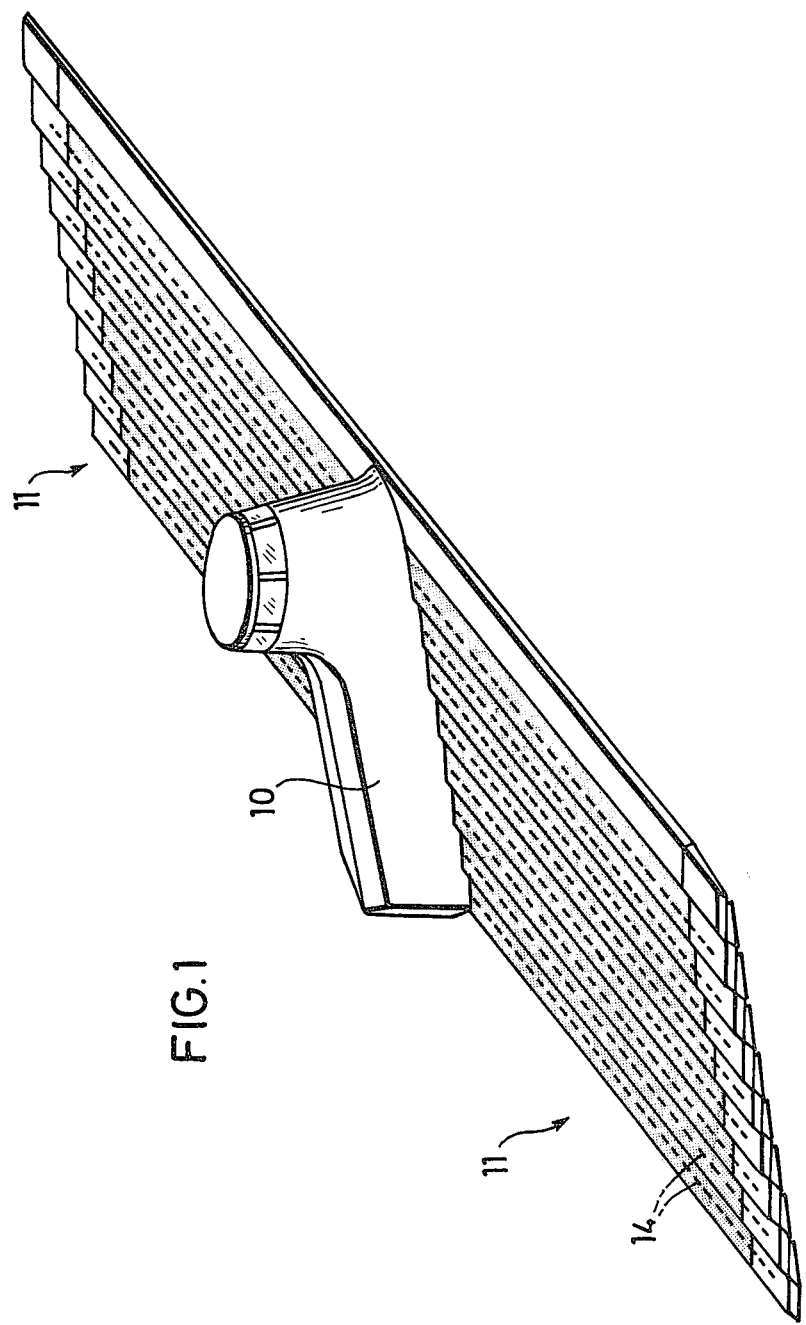
FIG. 1 is a diagrammatic perspective view of apparatus of the invention for obtaining a substance from a body of water such as the sea.
Figure 2:
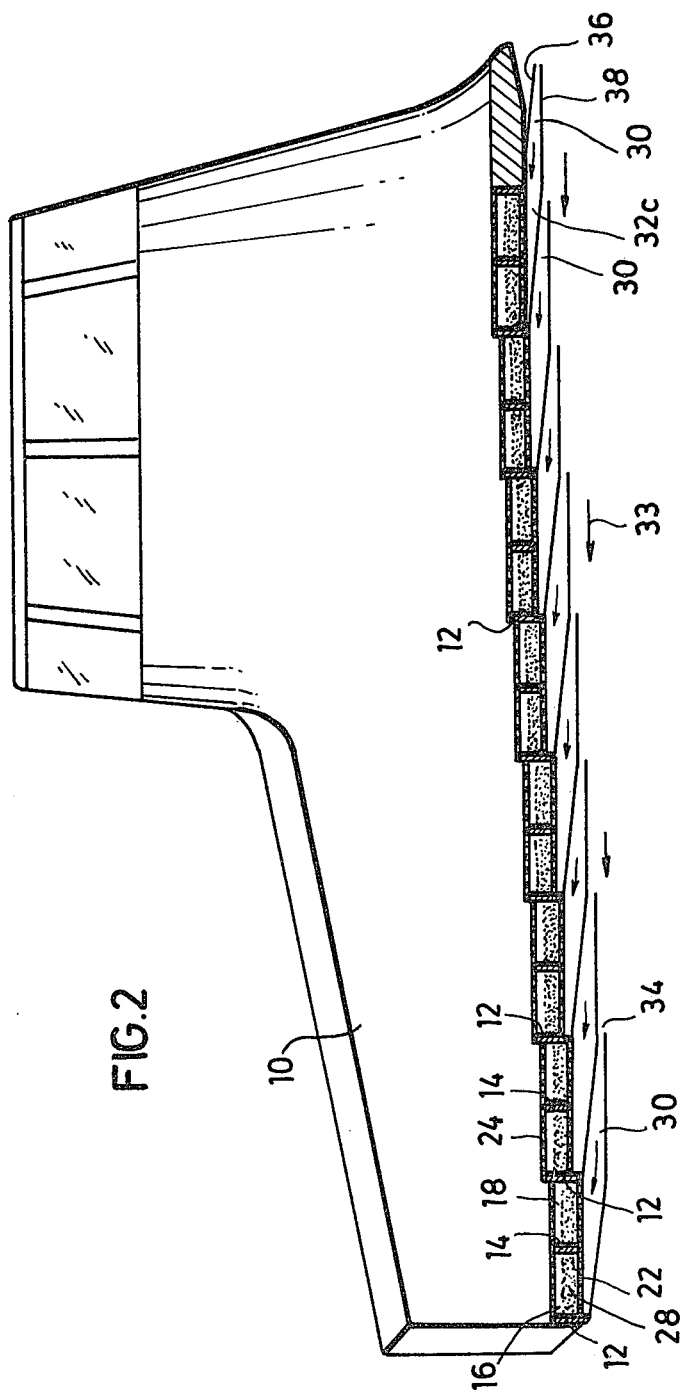
FIG. 2 is a side view, partly in section and on a larger scale, of the apparatus of FIG. 1.

Referring now to the drawings, the embodiment of the apparatus shown in FIGS. 1 and 2 has a central body or member 10 which may be in the form of a hull or float or floating body and which may be for example towed by a mother ship or for example anchored in a suitable flow of water. On both sides, the central member 10 carries projecting cantilever means or arms 11 which are provided with channels or passages through which water flows vertically and in which the beds of adsorption material are disposed. For reasons of clarity of the drawing, FIG. 1 only shows the basic structure of such apparatus, with details of the construction of the cantilever arms in FIGS. 2 through 4. The arms comprise a multiplicity of elongate casings or housings 12 which extend in a horizontal plane (in the normal operating position of the apparatus) and which are each sub-divided, by means of a central wall 14 which extends in the longitudinal direction of the respective housing 12, into two regions or passages 16 and 18. The arrangement is such that the central wall 14 is not extended fully to the free end of the respective cantilever arm 11 or housing 12 (see FIG. 4). Instead, there is a free access from one passage 16 into the other passage 18, as indicated at 20 in FIG. 4. Each housing 12 and thus the two regions or passages 16 and 18 of each housing 12 are defined at the bottom by a mesh, grid, screen or the like, as indicated at 22, which has a given flow resistance. This member 22 is used to stabilize and regularize the flow pattern within the adsorber bed. In addition, each housing 12, with its two channels 16 and 18, may also be covered at its top by a mesh, screen, grid or the like, as indicated at 24, the function of which is essentially to prevent adsorber particles from escaping upwardly from the housing 12.

Fresh, unsaturated adsorption material is continuously or discontinuously passed from the central member 10 into one of the two passages 16 and 18 in each housing 12, while saturated adsorption material is withdrawn from the respective other region or passage 16 or 18 and passed into the central member 10, preferably at the same rates and/or in the same quantities. If it is assumed that the fresh unsaturated adsorption material is passed into the passage 16, such material moves in the direction indicated by arrow 26 in FIG. 4 through the housing 12, passing into the passage 18 at the access opening 20 at the end of the passage 16 in which the material had moved away from the central member 10. The material is slowly moved back to the central member 10 again, through the passage 18. The adsorption material which is passed into the passage 16 from the central member 10 is loosened up and dispersed to form a fluidized bed 28 (FIG. 3). The adsorption material remains in the fluidized condition throughout the period of time that it is passing through the passages 16 and 18, while the input of fresh material into the passage 16 and the corresponding removal of saturated material from the passage 18, together with the tendency of the whole of the adsorption particles to be distributed as uniformly as possible in the fluid passing through the housing 12, results in a movement of the bed 28 parallel to the longitudinal direction of the housing 12 and thus transversely with respect to the direction of flow of the water within the housing 12, that is to say, within the passages 16 and 18. This very slow movement of the bed 28 is important and desirable because it permits continuous operation of the apparatus. After passing through the two passages 16 and 18 in a housing 12, the adsorption material particles may be eluted or washed. However, it is alternatively possible for the arrangement to be such that the adsorbent material particles pass successively through a plurality of cantilever arms or passages or regions 16 and 18 therein, before being subjected to the elution operation.

The adsorption material which is disposed within the housings 12 or more precisely, the passages 16 and 18, is fluidized by the water which flows into the housings 12 upwardly through the members 22. This presupposes that the natural flow of water in the sea or river (such flow may be caused by the apparatus moving through the water or by the water flowing relative to the apparatus or a combination of both), which flow is substantially in a horizontal plane, or the dynamic pressure or kinetic energy inherent in such a flow, is converted into a static pressure or pressure energy in order to cause the water to flow substantially vertically upwardly through the passages 16 and 18. This conversion of dynamic/static pressure is effected by using diffuser means 30. In the embodiment illustrated in FIGS. 1 and 2, a diffuser means 30 is disposed upstream (relative to the flow of water through the housing 12) of each housing with its two passages 16 and 18. It will be appreciated that, in a modification of the embodiment shown, it is possible for a single or common diffuser means 30 to be disposed upstream of a plurality of housings, or for each region or passage 16, 18 to have its own associated diffuser means 30.

In the embodiments shown in FIGS. 2 and 3, the apparatus is so arranged that the individual housings 12 are arranged in positions such that they are displaced relative to each other in a step-like formation, in such a way that, with respect to the direction of flow of water through the apparatus, each downstream housing 12 is disposed at a lower level than the directly preceding upstream housing. This arrangement provides that a diffuser means 30 is arranged below each housing 12, comprising a bottom wall member 38 disposed at a gradually increasing distance from the lower wall member of the housing or the lower grid or screen member 22. Each diffuser means 30 extends substantially in a horizontal plane and extends into an intermediate chamber or region 32 below the housing 12 with which the respective diffuser means 30 is associated. In FIG. 3, the individual housings 12 and the respective associated diffuser means and intermediate regions are denoted by the same references. The drawing shows that a diffuser 30 associated with a given housing 12, for example the diffuser 30c of the housing 12c, is disposed below the housing 12b which is disposed upstream of the housing 12c and which is thus one step higher. The transition from the diffuser means to the associated housing 12 or the regions 16 and 18 therein, for example the regions 16c and 18c, occurs by way of the intermediate chamber or region 32 in which diversion of the water from a substantially horizontal path into a generally vertically upwardly directed path occurs or at least begins. The direction of flow of the natural current in the sea or in the river, or generally the flow of water relative to the apparatus, is indicated by reference numeral 33 in FIGS. 2 and 3. The arrows shown in the diffuser means 30c, the intermediate regions 32c and the two regions 16c and 18c indicate the basic flow path. The inlet openings 34 for the diffuser means must be so arranged with respect to the flow 33 that the flow can pass into the diffuser means 30, more or less without being impeded.

FIGS. 2 and 3 show that fitting the apparatus with the diffuser means 30 does not give rise to any substantial increase in costs, each diffuser means being formed for example by sheet metal members or the like. Because each diffuser means, in view of the space available, may be of a length which is approximately equal to the width of a housing 12, it is readily possible under normal circumstances for the diffuser means to be adapted to the respective situation, with regard to their length. Moreover, there are no serious difficulties, and in particular no substantial increase in cost, in arranging at least one of the two walls 36 and 38 of each diffuser means 30 and intermediate chamber 32 in such a manner that the diffuser means is adjustable or displaceable. It will be seen from the general context that the extent of the members which define or form the diffuser means 30 and also the transitional regions 32 normally corresponds to the longitudinal extent of the respective housing 12 as the fluidized bed 28 is to be maintained over the entire longitudinal dimension of each housing 12, ie the two regions 16 and 18.

Figure 5:
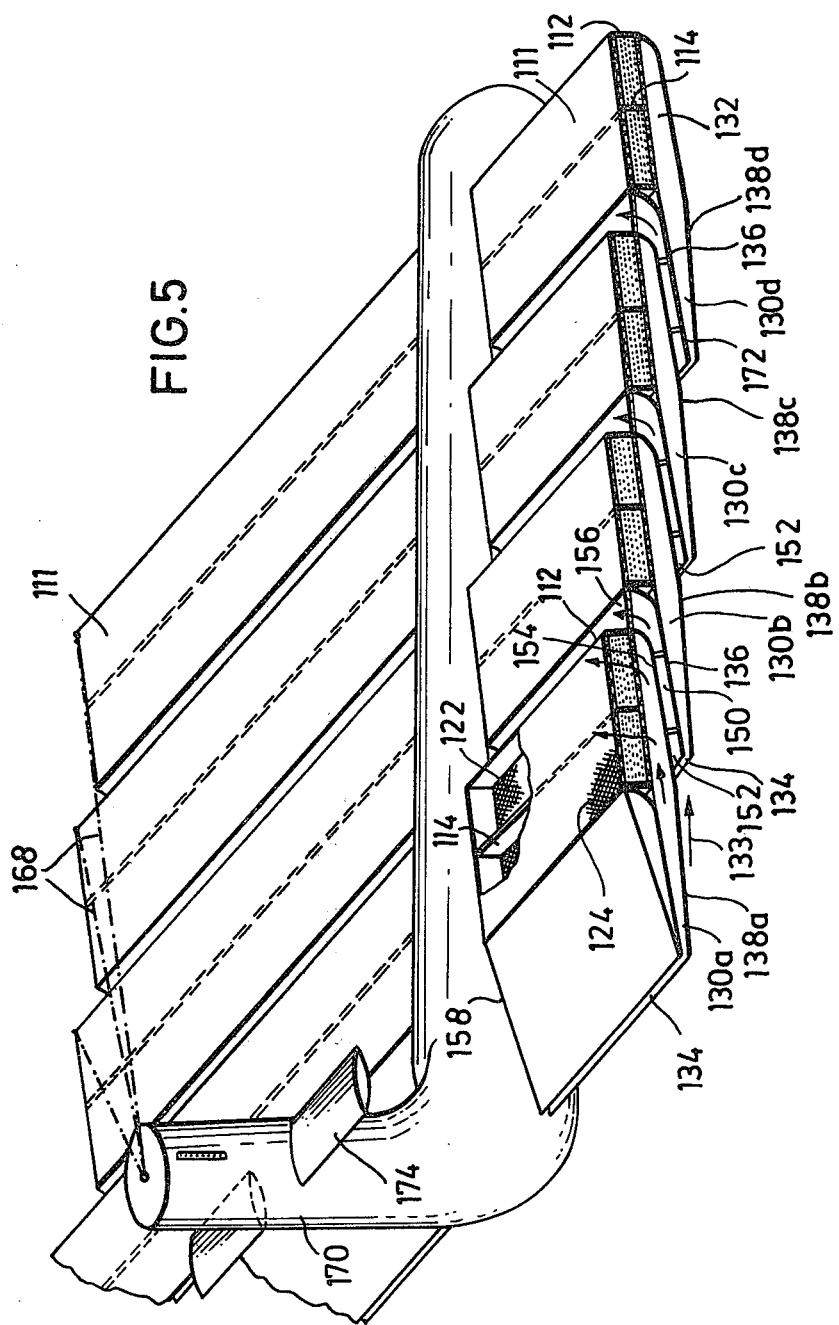
FIG. 5 shows a partly sectional perspective view of a further embodiment of the apparatus.

The embodiment shown in FIG. 5 corresponds in its basic construction to the structures shown in FIGS. 1 through 4 so that the same components are denoted by the same reference numerals but with the addition of 100 (for example, reference numeral 10 in FIG. 1 corresponds to reference numeral 110 in FIG. 5). The apparatus has an elongate central float member 110 which carries on both sides thereof substantially horizontally extending projection or cantilever means or arms 111, each of which comprises an inlet diffuser 130a-d defined by an upper wall 136 and a lower wall 138, an intermediate chamber 132, and passages 116 and 118 through which the water flows vertically upwardly and which are defined by the housing 112 and the middle dividing wall 114. The passages 116 and 118 are provided with top and bottom screens or grids 122 and 124 respectively. In this respect therefore, it will be seen that the FIG. 5 construction is the same as that shown in FIGS. 1 through 4. In addition, a diversion or by-pass passage 150 is provided between the adjacent structural units which each form a respective cantilever arm 111. The inlet opening 152 of each passage 150 is disposed above the respective inlet opening 134 of the diffuser means 130b-d disposed therebelow; both inlet openings 134 and 152 virtually lie in the same vertical plane. Each passage 150 is defined at its bottom by the upper wall 136 of the diffuser means 130b-d which is disposed thereunder. The lower wall 154 of the intermediate chamber 132 forms the upper wall of the respective passage 150 which thus extends substantially horizontally over the length of the diffuser means 130b-d and the intermediate chamber 132 disposed thereabove. The passage 150 opens upwardly at the end of the intermediate chamber 132 or the housing 112 disposed thereabove.

The purpose of the diversion passages is as follows:

Because the diffusers 130a-d of the individual successively disposed units 111 are arranged in a stepped arrangement in the direction of flow 133, generally as described above with reference to FIGS. 1 through 4, it is inevitable that, apart from the first diffuser means 130a (as viewed in the direction of flow) the water flowing towards each subsequent diffuser means flows at its upper boundary along the lower wall 138a-d of the preceding unit 111, before reaching the respective next following diffuser means. The boundary layer of this flow of water, which flows in contact with the wall 130a, suffers a reduction in its flow speed, and this reduction in speed is propagated downwardly in the course of the movement so that the thickness of the slowly moving layer of water increases in the direction of flow 133. At any event, the water passes into the subsequent diffuser means at a correspondingly reduced flow speed. When the water is flowing at a relatively high initial flow speed, this reduction in flow speed can be tolerated as the remaining speed of the flow of water is still sufficient to fluidize the bed 128 in the housing 112, and to keep it in a fluidized condition. At lower initial flow speeds however, for example about 1 meter/second, the reduction in flow speed due to friction between the lower wall of the respective preceding diffuser means and the boundary layer of the flow of liquid can result in the remaining flow speed being so low that the static pressure produced thereby in the diffuser means is no longer sufficient to provide for a sufficient flow through the fluidized bed. In this respect, an additional factor to be borne in mind is that the above-mentioned effects, that is to say, the reduction in flow speed at each lower wall or surface of the inlet diffuser means, are added together when there are a multiplicity of cantilever arms or units 111 disposed in succession in the direction of flow, so that the flow may virtually come to a halt, in the region of the diffuser means which are further downstream in the apparatus.

The embodiment of FIG. 5 takes account of this situation insofar as the layer of water which is influenced by the friction between for example the lower wall 138a of the diffuser means 130 and the boundary layer of the water flowing in the direction indicated by arrow 133 is picked up by the by-pass or diversion passage 150 and is discharged back into the free body of water by way of the upper outlet opening 156 of the passage 150. Only the layer of liquid which is disposed below the boundary layer passes into the subsequent diffuser means 130b. This liquid is at the more or less uninfluenced, normal flow speed, or at any event, a sufficient flow speed, so that, disregarding obviously the frictional losses within the diffuser means 130, the above-mentioned flow speed of the liquid flowing to the subsequent diffuser means 130b is sufficient to produce the static pressure for fluidization of the adsorption material particles in the housing 112. A similar situation also arises in respect of all subsequent diffuser means, 130c and 130d and the associated diversion passages 150.

It will be appreciated that, depending on the particular conditions prevailing, it is also possible for such diversion passages to be provided only on some of the units 111.

A guide or deflector plate 158 is arranged above the first diffuser 130a, in the direction of flow 133 upstream of the first housing 112, the purpose of the plate 158 being to prevent the flow of water from impinging frontally on to the first housing 112. If such impingement were to occur, this could result in turbulence which would impair non-turbulent discharge of the water leaving the bed of adsorption material particles in an upward direction.

It is desirable to ensure that the speed at which the water flows upwardly within the individual housings 112 is as uniform as possible over the horizontal cross-section of the housing. However, unless special measures are taken in this respect, it is generally inevitable for flow patterns 160a, 160b and 160c, approximately as shown in FIG. 6b, to be produced within each diffuser 130a–d because of friction between the water which is flowing in the direction of the arrow 133 in the diffuser means, on the one hand, and the walls 136 and 138 on the other hand. In this case, the flow in the middle region between the two walls 136 and 138 is noticeably faster than the flow in the upper and lower marginal regions. The irregularity of non-uniformity in speed, over the diffuser outlet cross-section 162, is continued into the intermediate chamber 132 and the passage 116 thereabove within the housing 112, so that there will necessarily also be irregularities within the bed of adsorber material particles.

In the diffuser embodiment shown in FIGS. 7a and 7b, in which the same parts as shown in FIGS. 5 and 6a, 6b are denoted by the same reference numerals, except that they are increased by 100, smaller compensating or balancing auxiliary diffuser means 264 and 266 are disposed within the diffuser means 230 in the middle region thereof, as viewed in a vertical direction. The auxiliary diffusers 264 and 266 are arranged one behind the other and extend over the entire length of the diffuser means 230, the vertical dimension of the second diffuser as viewed in the direction of flow 266 being less than that of the first diffuser 264. The marginal flows which are at the top and at the bottom in the diffuser means 230 remain substantially uninfluenced by the auxiliary diffusers 264 and 266. The flow speed profiles or patterns in FIG. 7b show, in comparison with those of FIG. 6b, that the internal or auxiliary diffuser means 264 and 266 cause the flow speed to be made noticeably uniform at the outlet 262, while also providing for an improvement in the efficiency of pressure conversion (dynamic pressure to static pressure) of some percent, for example possibly up to 10%. It will be appreciated that more than two compensating or auxiliary diffuser means may be disposed in succession, depending on the particular circumstances prevailing, while in some cases it may also be sufficient to provide only one compensating diffuser means.

Another possible way of making the flow pattern uniform over the discharge or outlet cross-section of the diffuser means could lie in the use of vortex generators which are built into the diffuser means, and which produce a swirl or eddy effect to render the flow speed uniform, as referred to hereinbefore.

In the embodiment of FIG. 5, the individual units 111 are braced or guyed to the upper end of a tower-like extension 170 on the carrier member 110, by way of cables 168. In addition, each individual unit 111 is supported, by way of support members 172 on which the lower wall 174 of the intermediate chamber 132 rests, on the upper wall 136 of the diffuser means 130a–d of the respective next following unit 111 as viewed in the flow direction 133. The support members 172 are for example of a resilient or elastic construction, for example in the form of coil springs, or they are connected to the wall 154 and/or 136 by way of interposed resilient or elastic connecting members. This means that the support members 172 pass through the respective diversion passage 150. The above-described arrangement provides that the structural rigidity of the whole of the cantilever arms or units 111 is comparatively low, the individual units 111 being movable relative to each other within certain limits so that for example when they are subjected to severe wave movement, the units 111 can to a certain extent adapt themselves to the movements of the water, independently of each other. This may be important because the individual units 111 may be for example up to 150 meters in length. The above-described construction makes it possible for the units 111 to be produced individually and then to be floated on to the central member 10, 100 for the purposes of assembling the components into the complete unit, and then mounted on the central member.

The components indicated by reference 174 are provided for positional and vertical stabilisation of the apparatus. The upper end of the tower-like extension 170 is provided with an opening through which the central member 110 is accessible from the exterior and for example the charged adsorption material particles can be removed and fresh adsorption material particles can be introduced. Another possible way of doing this is for the liquid which is required for elution of the charged adsorption material particles to be introduced into the member 110 through the opening in the extension 170, and for the charged liquid to be taken out of the apparatus for further processing, after the elution operation has been carried out.

Various modifications may be made without departing from the scope and spirit of the present invention, and such modifications are therefore deemed to be in accordance with the invention.

What is claimed is:

1. A process for obtaining a dissolved, suspended or chemically bonded substance from a body of water, comprising in combination, deflecting water from a substantially horizontal relative flow of said body of water substantially into a vertical direction and through a fluidized bed of adsorber particles for bonding said substance for extracting thereof from the water, and passing said water which is to be passed through the fluidized bed through diffuser means with an unimpeded flow path disposed in a substantially horizontal plane comprising a bottom wall member disposed to form a water entrance to the fluidized bed with a gradually increasing horizontally disposed flow cross section between a water entrance position and the fluidized bed before being deflected into the vertical direction to increase the static pressure of said water enough to fluidize the bed by water flow energy alone.

2. In a process for obtaining a dissolved, suspended or chemically bonded substance from a body of water, wherein water is taken from a substantially horizontal relative flow of said body of water and directed substantially into a vertical direction and through a fluidized bed of adsorber particles to bond said substance for extraction thereof from the water, the improvement that said water which is to be passed through the fluidized bed is passed through a diffuser means at least before being deflected into the vertical direction, thereby to increase the static pressure of said water wherein at least a low-energy boundary layer of said water, which is produced by surface friction before said flow of water reaches said diffuser means, is prevented from passing into the diffuser means by being directed therefrom by a diversion passage.

3. Apparatus for producing a substance from a body of water which has a relative flow with respect to the apparatus in a substantially horizontal direction comprising a housing with a lower entrance and which provides at least one substantially vertical passage for receiving a fluidizable bed of adsorption material, for a flow of water therethrough, substantially horizontally extending diffuser means with an entrance upstream of the entrance to said passage and a gradually increasing flow cross section defining an unimpeded flow path carrying said flow of water toward said lower entrance for receiving water from said relative flow of said body of water for increasing its static pressure enough to fluidize said bed solely from said flow, and deflection means for passing said water in said diffuser means upwardly in said passage after said pressure is achieved.

4. Apparatus as set forth in claim 3 wherein the diffuser means has a lower surface which extends substantially horizontally.

5. Apparatus as set forth in claim 4 wherein said housing has a bottom wall and wherein said lower surface extends substantially parallel to said housing lower entrance.

6. Apparatus as set forth in claim 3 wherein the diffuser means has upper and lower walls arranged symmetrically with respect to each other.

7. Apparatus for producing a substance from a body of water which has a relative flow with respect to the apparatus in a substantially horizontal direction comprising a housing with a lower entrance and which provides at least one substantially vertical passage for receiving a fluidizable bed of adsorption material, for a flow of water therethrough, substantially horizontally extending diffuser means with an entrance upstream of the entrance to said passage for receiving water from said relative flow of said body of water for increasing its static pressure enough to fluidize said bed solely from said flow, and deflection means for passing said water in said diffuser means upwardly in said passage after said pressure is achieved wherein said means for passing water to said passage comprises an intermediate chamber disposed between the diffuser means and the entrance of said passage and defined at its top by a wall of said housing and at its bottom by a wall, the spacing of the bottom wall from the housing wall decreasing in the direction of flow of the water in the chamber.

8. Apparatus for producing a substance from a body of water which has a relative flow with respect to the apparatus in a substantially horizontal direction comprising a housing with a lower entrance and which provides at least one substantially vertical passage for receiving a fluidizable bed of adsorption material, for a flow of water therethrough, substantially horizontally extending diffuser means with an entrance upstream of the entrance to said passage for receiving water from said relative flow of said body of water for increasing its static pressure enough to fluidize said bed solely from said flow, and deflection means for passing said water in said diffuser means upwardly in said passage after said pressure is achieved wherein said means for passing water to said passage comprises an intermediate chamber disposed between the diffuser means and the entrance of said passage and defined at its top by a flow-resistance screen means and at its bottom by a wall, the spacing of the bottom wall from the screen means decreasing in the direction of flow of the water in the chamber.

9. Apparatus for producing a substance from a body of water which has a relative flow with respect to the apparatus in a substantially horizontal direction comprising a housing which provides at least one substantially vertical passage for receiving a fluidizable bed of adsorption material, for a flow of water therethrough, a substantially horizontally extending diffuser means upstream of the entrance to said passage for receiving water from said relative flow of said body of water, and means for passing said water in said diffuser means to said passage wherein at least two said housings are arranged successively in the direction of flow of said body of water and are displaced in height relative to each other in such a way that each housing is at a different level from the preceding housing in the direction of flow, wherein a diffuser means is operatively associated with at least one housing, and said diffuser means is disposed adjacent the preceding housing.

10. Apparatus as set forth in claim 9 wherein said diffuser means has an inlet opening disposed at a spacing from an adjacent surface of the respective preceding housing, and wherein a diversion passage is arranged adjacent said diffuser means and parallel thereto, for diverting a water boundary layer which is formed against the surface of an upstream-disposed housing and diffuser means away from said at least one diffuser means.

11. Apparatus as set forth in claim 10 wherein said spacing is substantially adapted to the thickness of said water boundary layer.

12. Apparatus as set forth in claim 10 wherein said diversion passage extends between the diffuser means and the housing of the upstream-disposed housing and has an outlet disposed between two housings which are disposed successively in said direction of flow.

13. Apparatus as set forth in claim 10 wherein the diffuser means has several parts, including a diversion passage associated with each diffuser means part.

14. Apparatus for producing a substance from a body of water which has a relative flow with respect to the apparatus in a substantially horizontal direction comprising a housing which provides at least one substantially vertical passage for receiving a fluidizable bed of adsorption material, for a flow of water therethrough, a substantially horizontally extending diffuser means upstream of the entrance to said passage for receiving water from said relative flow of said body of water, and means for passing said water in said diffuser means to said passage and further including at least one compensating diffuser means arranged within said diffuser means between the upper and lower walls thereof in the middle region in a vertical direction, adapted to render uniform the speed and static pressure of the flow of water in the diffuser means, over the cross-section thereof.

15. Apparatus as set forth in claim 14 including a plurality of said compensating diffuser means arranged in succession in the direction of flow in said diffuser means, wherein each compensating diffuser means is of smaller cross-sectional area than the preceding compensating diffuser means in the direction of flow in the diffuser means, the reduction in cross-sectional area being adapted in dependence on non-uniformity in respect of speed and static pressure of said flow, which remains after the preceding compensating diffuser means.

16. Apparatus for producing a substance from a body of water which has a relative flow with respect to the apparatus in a substantially horizontal direction comprising a housing with a lower entrance and which provides at least one substantially vertical passage for receiving a fluidizable bed of adsorption material, for a flow of water therethrough, substantially horizontally extending diffuser means with an entrance upstream of the entrance to said passage for receiving water from said relative flow of said body of water for increasing its static pressure enough to fluidize said bed solely from said flow, and deflection means for passing said water in said diffuser means upwardly in said passage after said pressure is achieved wherein said housing, said diffuser means and an intermediate chamber form said deflection means for passing water to said passage form a structural unit, a plurality of said units are non-rigidly fitted together and at least one said unit includes a division passage disposed to direct a boundary layer of water from the diffuser means.

17. Apparatus as set forth in claim 16 wherein the wall of the intermediate chamber of each said structural unit forms an upper boundary of the diversion passage of the respective structural unit which follows in the direction of flow.

18. Apparatus as set forth in claim 16 wherein the wall of the intermediate chamber of each said structural unit forms a lower boundary of the diversion passage of the respective structural unit which follows in the direction of flow.

19. Apparatus as set forth in claim 16 wherein one said unit lies on the respective adjacent structural unit, with a resilient means disposed therebetween.

20. Apparatus as set forth in claim 19 wherein said resilient means is arranged between the intermediate chamber and the diffuser means of two successive said units.

21. Apparatus as set forth in claim 16 including a main carrier member, wherein said units are suspended on the carrier member by way of flexible mountings.

22. A process for extracting a substance from a body of water comprising: taking a flow of water from a substantially horizontal relative flow of said body of water, directing said taken flow into a substantially vertical direction, passing said taken flow through a fluidized adsorber particle bed thereby to extract said substance from said taken flow, and passing said taken flow through diffuser means comprising an unimpeded flow path with a gradually increasing flow cross section carrying said taken flow toward said bed before passing in a vertical direction through said passage thereby to increase static pressure in said taken flow enough to fluidize said bed.

\* \* \* \* \*